United States Patent
Santana et al.

(10) Patent No.: US 12,449,132 B2
(45) Date of Patent: Oct. 21, 2025

(54) MATCHING A COOKING SURFACE SIZE TO APPROPRIATE COOKWARE AND COOKING APPLIANCE IMPLEMENTING THE SAME

(71) Applicant: Haier US Appliance Solutions, Inc., Wilmington, DE (US)

(72) Inventors: Omar Santana, Louisville, KY (US); Catherine Berghuis, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 662 days.

(21) Appl. No.: 17/706,804

(22) Filed: Mar. 29, 2022

(65) Prior Publication Data

US 2023/0314001 A1    Oct. 5, 2023

(51) Int. Cl.
*F24C 7/08*    (2006.01)
*G08B 7/06*    (2006.01)
*H04W 76/10*   (2018.01)
*H05B 6/12*    (2006.01)

(52) U.S. Cl.
CPC .............. *F24C 7/083* (2013.01); *F24C 7/086* (2013.01); *G08B 7/06* (2013.01); *H04W 76/10* (2018.02); *H05B 6/1218* (2013.01); *H05B 2213/06* (2013.01)

(58) Field of Classification Search
CPC . F24C 7/083; F24C 7/086; G08B 7/06; H05B 6/1218; H05B 2213/06; H05B 6/062; H05B 6/1209; A47J 36/321
USPC ........................................................ 126/39 E
See application file for complete search history.

(56) References Cited

U.S. PATENT DOCUMENTS

| | | | |
|---|---|---|---|
| 10,830,450 B2* | 11/2020 | Cadima ..................... | F24C 3/12 |
| 2010/0147832 A1 | 6/2010 | Barker, III et al. | |
| 2016/0299595 A1* | 10/2016 | Bach ......................... | F24C 7/086 |
| 2018/0128493 A1* | 5/2018 | Chen ......................... | F24C 7/083 |
| 2022/0159792 A1* | 5/2022 | Newquist .................. | H05B 6/645 |

FOREIGN PATENT DOCUMENTS

| | | | |
|---|---|---|---|
| CN | 110701639 A | 1/2020 | |
| CN | 112460642 A | 3/2021 | |
| CN | 113116122 A * | 7/2021 | |
| DE | 102008064731 B4 | 9/2014 | |
| EP | 2192820 B1 | 6/2011 | |
| EP | 3013120 B1 | 8/2019 | |
| WO | WO-2019209371 A1 * | 10/2019 | ............ A47J 27/004 |

* cited by examiner

*Primary Examiner* — Allen R. B. Schult
*Assistant Examiner* — William C Weinert
(74) *Attorney, Agent, or Firm* — Dority & Manning, P.A.

(57) ABSTRACT

A cooktop appliance includes a cooking surface including a plurality of burners; a control panel operably coupled to the cooking surface, the control panel including a plurality of controls for operating the plurality of burners; and a controller operably coupled to the cooking surface and the control panel. The controller is configured for determining that a cookware item has been activated; receiving a remote signal from the activated cookware item; determining a recommended burner of the plurality of burners in response to receiving the remote signal from the activated cookware item; and implementing a responsive action in response to determining the recommended burner of the plurality of burners.

18 Claims, 5 Drawing Sheets

| COOKWARE TYPE 142 | BASE DIAMETER 144 | COOKWARE IDENTIFIER (ID) 146 | RECOMMENDED BURNERS/DIAMETERS 148 |
|---|---|---|---|
| FRY PAN | 7.5" | 01 | 1B, 2 |
| POT TYPE 1 | 6.5" | 02 | 4, 5A |
| POT TYPE 2 | 9" | 03 | 1B, 2, 5B |

MATCHING A COOKING SURFACE SIZE TO APPROPRIATE COOKWARE AND COOKING APPLIANCE IMPLEMENTING THE SAME

FIELD OF THE INVENTION

The present subject matter relates generally to cooking appliances, and more particularly to cooktop appliances having a variety of burner sizes.

BACKGROUND OF THE INVENTION

Traditional cooktop appliances include multiple burners, or heating elements which selectively provide heat to cookware items placed thereupon. Generally, heating elements are provided in a variety of sizes to allow for different sized cookware and adjustable heat levels, cooking operations, and the like. Similarly, cookware items are provided in a variety of sizes to allow for varying amounts of food or other items to be cooked more efficiently and easily. With conventional cooktops, a user must select the appropriate burner for the selected cookware.

However, further improvements are required to improve the performance and efficiency of cooktop appliances. For instance, when a cookware item is significantly larger than the burner size selected, an inefficient heating operation will commence, resulting in longer heating periods and lower total heat output. Similarly, when a cookware item is significantly smaller than the burner size selected, wasted heat energy is released around the cookware item, again reducing efficiency and presenting dangers within and around the cooktop appliance.

Accordingly, a cooktop appliance that obviates one or more of the above-mentioned drawbacks would be beneficial. In particular, a cooktop appliance that ensures efficient burner use according to selected cookware items would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method for operating a cooktop appliance is provided. The cooktop appliance may include a cooktop surface defining a plurality of burners. The method may include receiving a remote signal from an activated cookware item; determining a recommended burner arrangement of the plurality of burners in response to receiving the remote signal from the activated cookware item; and directing activation of one or more burners of the plurality of burners based on the recommended burner arrangement.

In another exemplary aspect of the present disclosure, a cooktop appliance is provided. The cooktop appliance may include a cooking surface, the cooking surface including a plurality of burners; a control panel operably coupled to the cooking surface, the control panel including a plurality of controls for operating the plurality of burners; and a controller operably coupled to the cooking surface and the control panel, the controller including a wireless connection module. The controller may be configured for receiving a remote signal from an activated cookware item; determining a recommended burner arrangement of the plurality of burners in response to receiving the remote signal from the activated cookware item; and directing activation of one or more burners of the plurality of burners based on the recommended burner arrangement.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
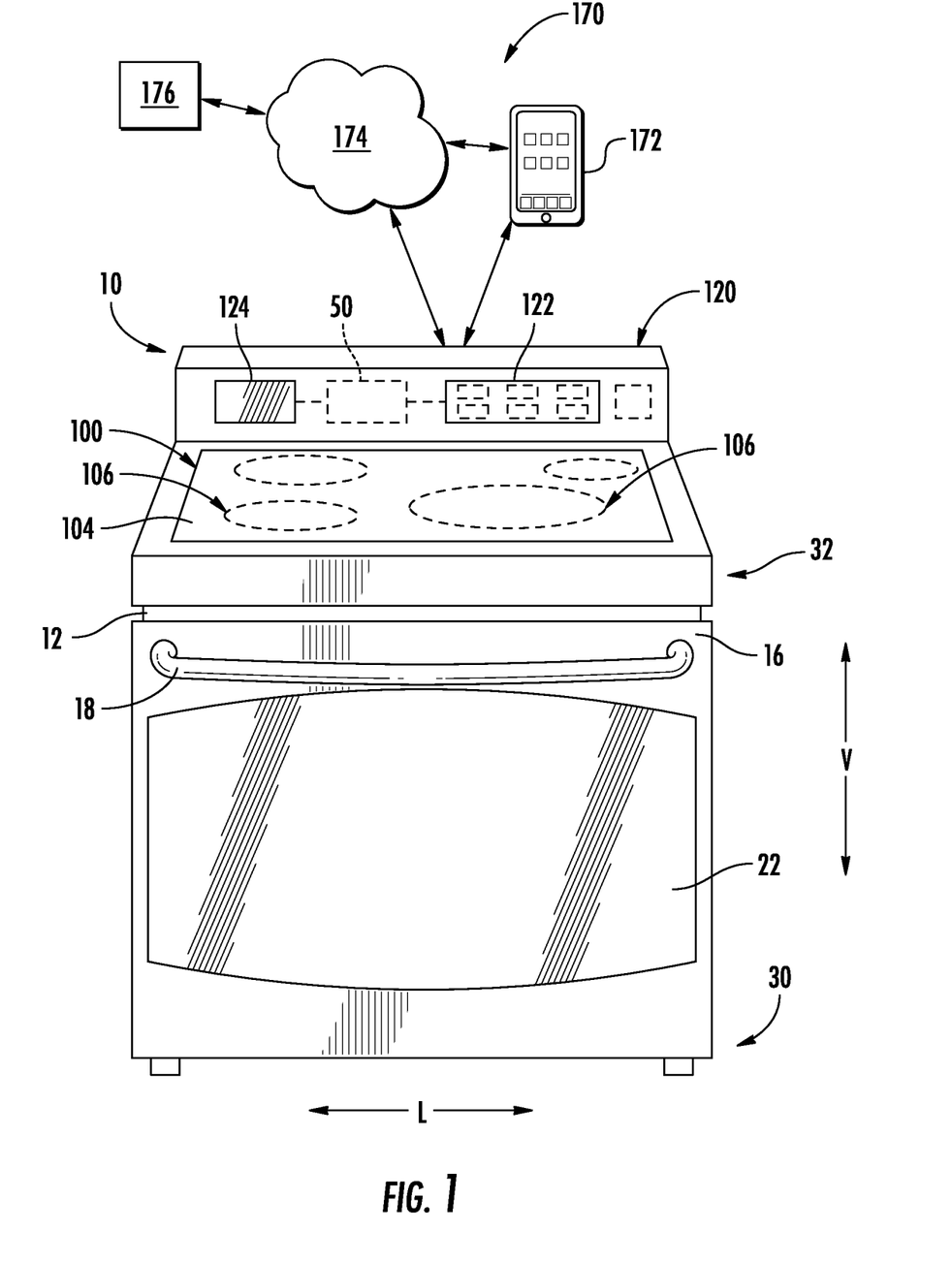
FIG. 1 provides a perspective view of a cooking appliance according to exemplary embodiments of the present disclosure.

FIG. 1 provides a perspective view of an oven appliance 10 according to an exemplary embodiment of the present disclosure. Oven appliance 10 is provided by way of example only and is not intended to limit the present subject matter in any aspect. Other oven or range appliances having different configurations, different appearances, or different features may also be utilized with the present subject matter as well (e.g., double ovens, electric cooktop ovens, stand-alone ovens, etc.).

Thus, the present subject matter may be used with other oven appliance configurations (e.g., that define one or more cooktop surfaces including a plurality of heating elements or burners). Further, the present subject matter may be used in a stand-alone cooktop, range appliance, or any other suitable appliance.

Oven appliance 10 generally includes a cooking assembly. In particular, the cooking assembly may include one or more heating elements. For example, in some embodiments, the cooking assembly, and thus the oven appliance 10 includes an insulated cabinet 12 with an interior cooking chamber defined by an interior surface of cabinet 12. The cooking chamber may be configured for the receipt of one or more food items to be cooked. The cooking chamber may be defined by a back wall, a top wall, and a bottom wall spaced from the top wall along the vertical direction V by opposing side walls (e.g., a first wall and a second wall).

Oven appliance 10 may include a door 16 rotatably mounted to cabinet 12 (e.g., with a hinge—not shown). A handle 18 may be mounted to door 16 and assists a user with opening and closing door 16 in order to access the cooking chamber. For example, a user can pull on handle 18 to open or close door 16 and access the cooking chamber.

Generally, oven appliance 10 may include a controller 50 in operative communication (e.g., operably coupled via a wired or wireless channel) with one or more other portions of oven appliance 10 (e.g., heating elements) via, for example, one or more signal lines or shared communication busses, and signals generated in controller 50 operate oven appliance 10 in response to user input via user inputs 122. Input/Output ("I/O") signals may be routed between controller 50 and various operational components of oven appliance 10 such that operation of oven appliance 10 can be regulated by controller 50. In addition, controller 50 may also be in operative communication (e.g., wired or, alternatively, wireless communication) with one or more sensors, such as a first temperature sensor or a second temperature sensor. Generally, either or both the first temperature sensor and the second temperature sensor may include or be provided as a thermistor or thermocouple, which may be used to measure temperature at a location within or proximate to the cooking chamber, for example, and provide such measurements to the controller 50.

Controller 50 is a "processing device" or "controller 50" and may be embodied as described herein. Controller 50 may include a memory and one or more microprocessors, microcontrollers, application-specific integrated circuits (ASICS), CPUs or the like, such as general or special purpose microprocessors operable to execute programming instructions or micro-control code associated with operation of oven appliance 10, and controller 50 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 50 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Referring still to FIG. 1, a schematic diagram of an external communication system 170 will be described according to an exemplary embodiment of the present subject matter. In general, external communication system 170 is configured for permitting interaction, data transfer, and other communications between appliance 10 and one or more external devices. For example, this communication may be used to provide and receive operating parameters, user instructions or notifications, performance characteristics, user preferences, or any other suitable information for improved performance of appliance 10. In addition, it should be appreciated that external communication system 170 may be used to transfer data or other information to improve performance of one or more external devices or appliances and/or improve user interaction with such devices.

For example, external communication system 170 permits controller 50 of appliance 10 to communicate with a separate device external to appliance 10, referred to generally herein as an external device 172. As described in more detail below, these communications may be facilitated using a wired or wireless connection, such as via a network 174. In general, external device 172 may be any suitable device separate from appliance 10 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device. Additionally or alternatively, with respect to embodiments described herein, external device may be a cookware item (e.g., cookware item 160, described below).

In addition, a remote server 176 may be in communication with appliance 10 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control appliance 10, etc. In addition, external device 172 and remote server 176 may communicate with appliance 10 to communicate similar information.

In general, communication between appliance 10, external device 172, remote server 176, and/or other user devices or appliances may be carried using any type of wired or wireless connection and using any suitable type of communication network, non-limiting examples of which are provided below. For example, external device 172 may be in direct or indirect communication with appliance 10 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Oven appliance 10 may include a cooktop 100. Cooktop 100 may be disposed on the cabinet 12 such that the total volume of cabinet 12 is generally divided between the cooking chamber and cooktop 100. As shown, cooktop 100 may include a top panel 104. By way of example, top panel 104 may be constructed of glass, ceramics, enameled steel, and combinations thereof. Heating assemblies 106 (e.g., induction heating elements, resistive heating elements, radiant heating elements, or gas burners) may be mounted, for example, on or below the top panel 104. While shown with four heating assemblies 106 in the exemplary embodiment of FIG. 1, cooktop appliance 10 may include any number of heating assemblies 106 in alternative exemplary embodiments. Heating assemblies 106 can also have various diameters. For example, each heating assembly of heating assemblies 106 can have a different diameter, the same diameter, or any suitable combination thereof. Moreover, as will be explained in more detail below, one or more of the heating assemblies 106 may have varying diameters (e.g., multiple concentric rings offering different power levels and/or heat production).

As shown, certain embodiments of oven appliance 10 include a user interface panel 120, which may be located as shown, within convenient reach of a user of the oven appliance 10. User interface panel 120 is generally a component that allows a user to interact with the oven appliance 10 to, for example, turn various heating elements (such as heating elements 106) on and off, adjust the temperature of the heating elements, set built-in timers, etc. Although user interface panel 120 is shown mounted to a backsplash fixed to cabinet 12, alternative embodiments may provide user interface panel 120 at another suitable location (e.g., on a front portion of cabinet 12 above door 16).

In some embodiments, a user interface panel 120 may include one or more user-interface inputs 122 and a graphical display 124, which may be separate from or integrated with the user-interface inputs 122. The user-interface element 122 may include analog control elements (e.g., knobs, dials, or buttons) or digital control elements, such as a touchscreen comprising a plurality of elements thereon. Various commands for a user to select through the engagement with the user-interface inputs 122 may be displayed (e.g., by touchscreen at the inputs 122 or by the graphical display 124), and detection of the user selecting a specific command may be determined by the controller 50, which is in communication with the user-interface inputs 122, based on electrical signals therefrom. Additionally or alternatively, graphical display 124 may generally deliver certain information to the user, which may be based on user selections and interaction with the inputs 122, such as whether one or more heating elements within the cooking chamber are activated or the temperature at which the cooking chamber is set.

Figure 2:
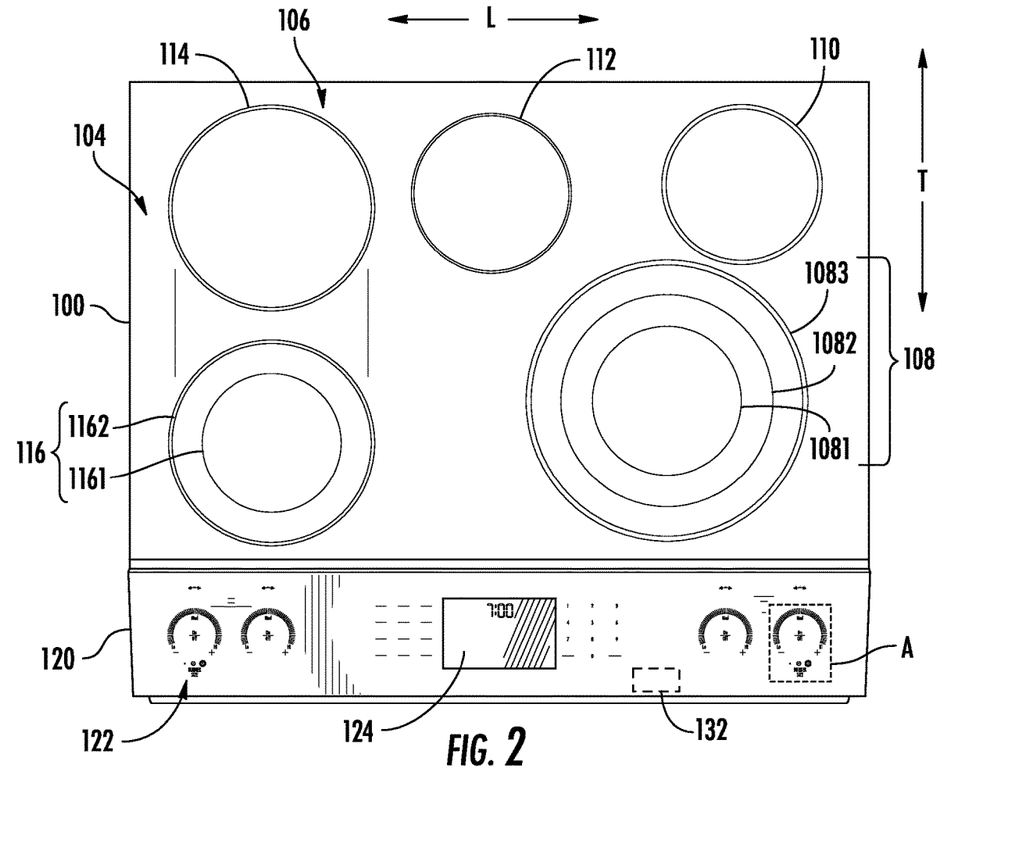
FIG. 2 provides a top view of a cooktop appliance according to another exemplary embodiment of the present disclosure.

FIG. 2 provides a top view of an exemplary cooktop 100 and user interface panel 120 according to at least one embodiment of the present disclosure. As seen in FIG. 2, user interface panel 120 may be provided at or near a front of cooktop 100 (e.g., along a transverse direction T). Moreover, according to the embodiment shown in FIG. 2, cooktop 100 includes five burners (e.g., heating assemblies 106) spatially arranged thereon. As described above, cooktop 100 may include top panel 104 on which heating assemblies 106 are arranged. According to this example, the plurality of heating assemblies 106 are electric burners 106. In particular, the electric burners 106 may be provided as radiant burners, as would be understood. At least some of the electric burners 106 may be variable in diameter.

In detail, as seen in FIG. 2, a first burner 108 may include three distinct diameters including a first diameter 108₁, a second diameter 108₂, and a third diameter 108₃. First diameter 108₁ may be smaller than second diameter 108₂, while second diameter 108₂ may be smaller than third diameter 108₃. One or a combination of diameters may be activated simultaneously to provide variable levels of heat. For instance, first burner 108 may be activated at first diameter 108₁ to provide a first level (or amount) of heat (i.e., heat or power output). First burner 108 may be activated at first diameter 1081 and second diameter 1082 to provide a second level of heat. First burner 108 may be activated at first diameter 1081, second diameter 1082, and third diameter 1083 to provide a third level of heat. It should be understood that any suitable combination of burner diameters may be activated to provide a variable amount of heat or power.

Moreover, each of the plurality of burners 106 may be capable of providing selective levels of heat output. In detail, a user may adjust a heat output from a selected burner (or burner diameter) according to a desired heat level. Accordingly, a user may select first burner 108 at the first diameter 1081. While first diameter 1081 outputs a first level of heat (e.g., at full power) that is less than an output of, for example, first diameter 1081 and second diameter 1082 together, the user may adjust a total heat output of just the first diameter 1081 (e.g., via user interface panel 120, described below). Additionally or alternatively, a combination of burners may be activated by the user. For example, the user can activate fourth burner 114 and fifth burner 116 (e.g., second diameter 1162) simultaneously to create a griddle burner. It should be understood that any suitable activation level or intensity of a selected burner (or burner diameter), as well as any suitable combination of burners may be activated according to specific embodiments.

User interface panel (or control panel) 120 may include one or more user inputs 122. As discussed above, user inputs 122 may be analog or digital, or a combination thereof. For the embodiment described herein, user inputs 122 are touch inputs on user interface panel 120. Accordingly, user interface panel 120 may be referred to as a touch panel. User interface panel 120 may include a plurality of inputs 122, e.g., one for each burner (first burner 108, second burner 110, etc.). Inputs 122 may be spaced apart from each other along user interface panel 120. For instance, inputs 122 may be spaced apart along the lateral direction L. An exemplary input 122 is shown in subset A, which is provided in FIG. 3.

Figure 3:
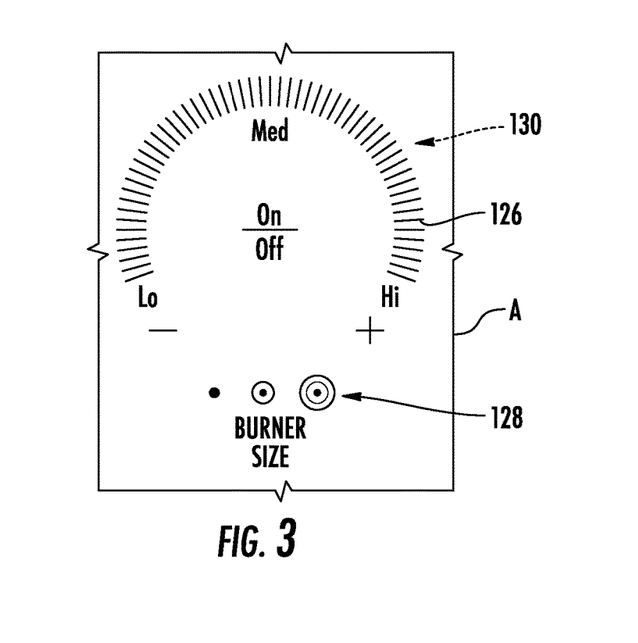
FIG. 3 provides a close-up view of a control input of the cooktop appliance of FIG. 2.

Input 122 may include a plurality of interactive controls. For instance, input 122 may include a power slider 126. As shown, power slider 126 may be provided as a semi-circular arc on touch panel 120. A user may adjust a power input to the respective burner by sliding a finger along the power slider 126. Additionally or alternatively, input 122 may include a burner size selector 128. As shown in FIG. 3, burner size selector 128 may include one or more indicators indicating a burner size (e.g., burner diameter). Using first burner 108 as an example, burner size selector 128 may include a first indicator with a single ring, a second indicator with two rings, and a third indicator with three rings. Burner size selector 128 may selectively illuminate or otherwise accentuate one or more of the plurality of indicators associated with the activated burner diameters. For at least one example, a user selects first burner 108 with first diameter 1081 and second diameter 1082 activated. Accordingly, burner size selector 128 illuminates or accentuates the second indicator to indicate that the first diameter 1081 and the second diameter 1082 are actively producing heat. Accordingly, a user may select which burner diameters will be active during a cooking operation.

User interface panel 120 may include one or more light sources 130. According to some embodiments, light sources 130 are provided behind (e.g., underneath) user inputs 122. For instance, each of power slider 126 and burner size selector 128 may have a dedicated light source which illuminates a selected portion of input 122 at a selected time. Additionally or alternatively, one or more light sources may be provided on an external surface of user interface panel 120. For instance, one or more light emitting diodes (LEDs) may be provided at or near user inputs 122 or display 124. Moreover, the one or more light emitting diodes may be activated independently from an operation or interaction with user inputs 122 or display 124.

Cooktop 100 may include a speaker 132. For instance, speaker 132 may be any suitable noise maker, such as a transducer, a buzzer, a bell, or the like. Speaker 132 may be selectively controlled by controller 50. Activation of speaker 132 may be combined with an activation of one or more of light sources 130.

Display 124 may be a digital display. For instance, display 124 may be a liquid crystal display (LCD) or any other suitable interactive display. Accordingly, display 124 may present one or more complex images associated with appliance 10 (e.g., cooktop 100). According to one embodiment, display 124 displays a plurality of rings associated with the plurality of burners 106 and burner diameters. Again referring to first burner 108 as an example, display 124 displays first burner 108 as three concentric circles representing first diameter 1081, second diameter 1082, and third diameter 1083. Display 124 may selectively illuminate or otherwise accentuate one or more of the plurality of rings associated with the activated burner diameters. For at least one example, a user selects first burner 108 with first diameter 1081 and second diameter 1082 activated. Accordingly, display 124 illuminates or accentuates a first ring and a second ring to indicate that the first diameter 1081 and the second diameter 1082 are actively producing heat.

Figure 4:
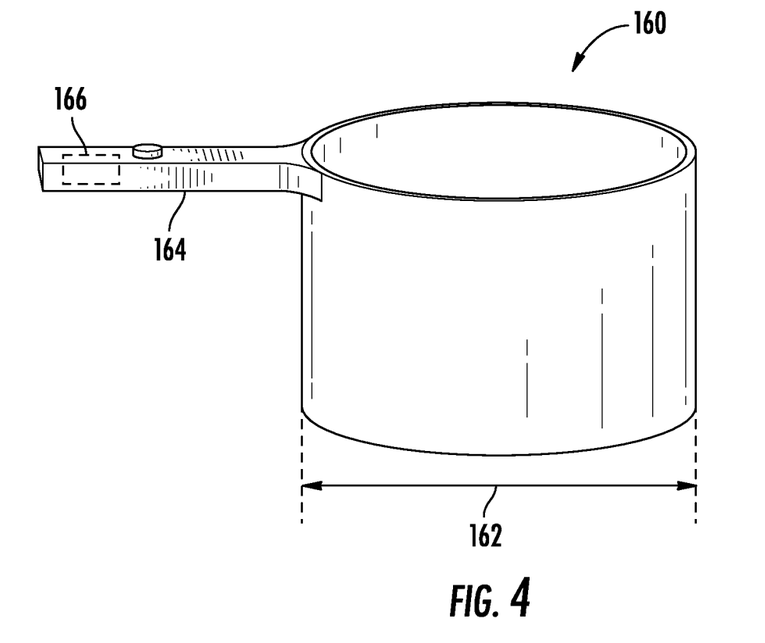
FIG. 4 provides a perspective view of a cookware item according to exemplary embodiments of the present disclosure.

FIG. 4 provides an exemplary cookware item 160. In detail, cookware item 160 may be a saucepan. Cookware item 160 may include a cylindrical body defining a bottom diameter 162 and a handle 164 extending from the body. Cookware item 160 shown in FIG. 4 is provided by way of example only, and it should be understood that any suitable piece of cookware (e.g., a pan, a pot, a griddle, a kettle, etc.) may be incorporated as a cookware item used herein. Cookware item 160 may include a wireless communication module 166 provided within handle 164. Wireless communication module 166 may selectively communicate with controller 50 of appliance 10. For instance, wireless communication module 166 may establish a wireless connection with controller 50 to provide one or more signals indicating a status of cookware item 160 (e.g., awake, in use, current temperature, etc.). Moreover, wireless communication module 166 may include a memory that stores certain information regarding cookware item 160. Additionally or alternatively, controller 50 may store information regarding multiple cookware items 160, each cookware item 160 being identified via a cookware identifier (e.g., as will be described in detail below).

Figure 5:
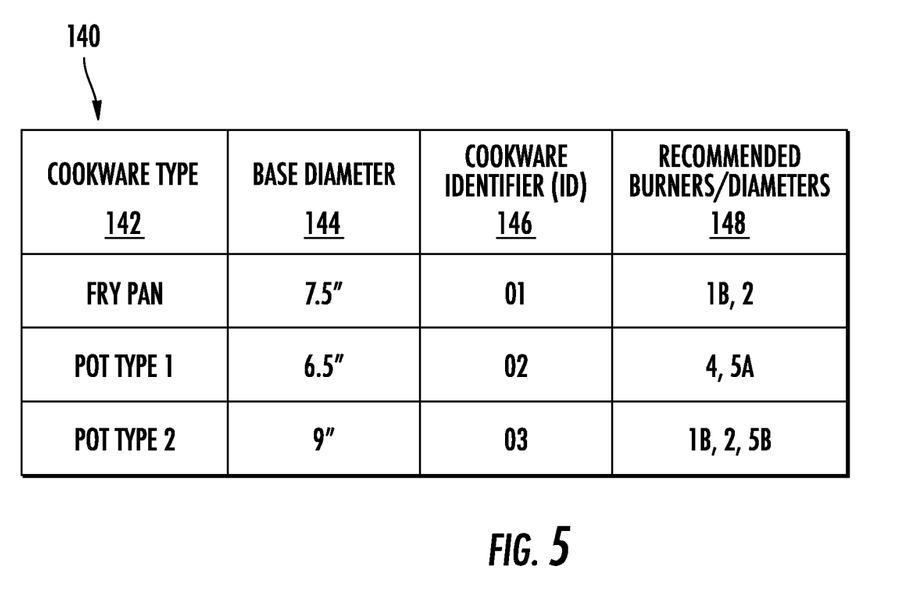
FIG. 5 provides a table illustrating an information packet provided in the memory of the exemplary cooktop appliance of FIG. 2.

For instance, as shown in FIG. 5, the memory may be stored as a table 140. Table 140 may include a plurality of cells containing information. According to at least one example, table 140 includes a cookware type 142 (e.g., frying pan, saucepan, large pot, etc.), a base diameter of the cookware type 144 (e.g., 6 inches, 7.5, inches, 10 inches, etc.), a cookware identifier 146 (e.g., a sequence of characters such as numbers and/or letters), and one or more recommended burner arrangements 148. It should be noted that more or fewer columns may be included in table 140. For example, table 140 may be provided with only a cookware identifier column 146 and a recommended burner arrangement column 148. Accordingly, controller 50 may determine a recommended or suggested burner selection for a user based on the cookware item 160 identified on top panel 104. Advantageously, a more efficient cooking operation may be suggested by controller 50 to prevent waste heat, ensure heat transfer efficiency, and overt excessive cooking times, as will be explained below.

Figure 6:
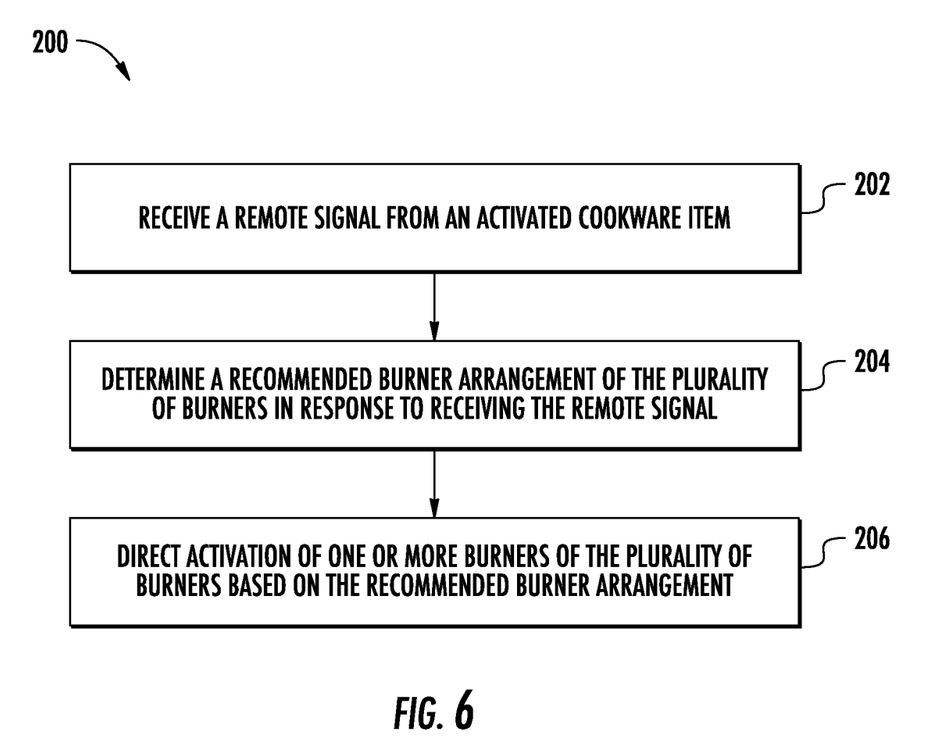
FIG. 6 provides a flowchart illustrating a method of operating a cooktop appliance according to exemplary embodiments of the present disclosure.
Figure 7:
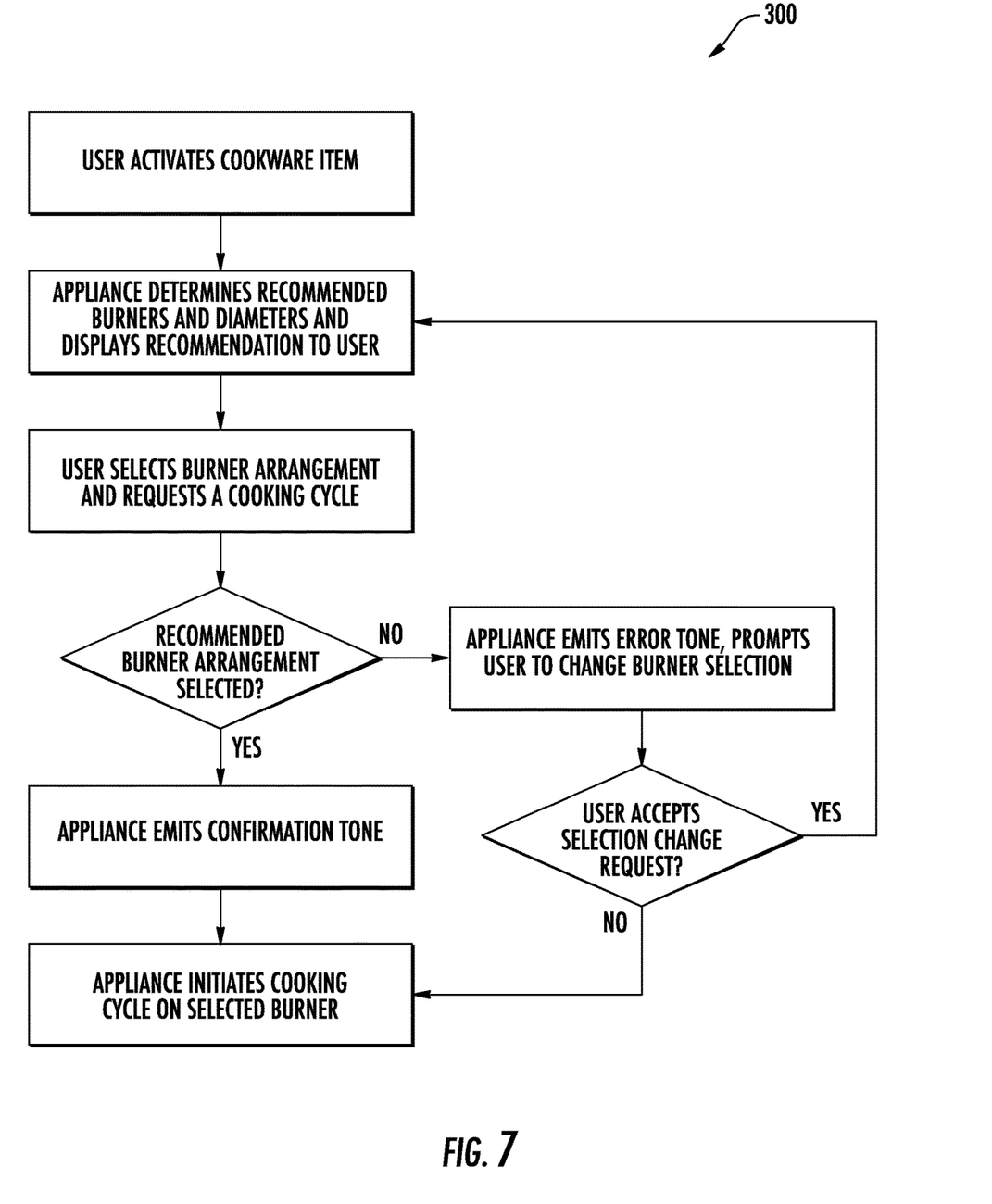
FIG. 7 provides a flowchart illustrating a method of operating a cooktop appliance according to exemplary embodiments of the present disclosure.

Now that the general descriptions of an exemplary appliance have been described in detail, a method 200 of operating an appliance (e.g., oven appliance 10 or cooktop 100) will be described in detail. Although the discussion below refers to the exemplary method 200 of operating oven appliance 10 or cooktop 100, one skilled in the art will appreciate that the exemplary method 200 is applicable to any suitable domestic appliance capable of performing a cooking operation (e.g., such as a stand-alone cooktop, an independent burner, etc.). In exemplary embodiments, the various method steps as disclosed herein may be performed by controller 50 and/or a separate, dedicated controller. FIGS. 6 and 7 provide flow charts illustrating methods of operating an exemplary cooktop, e.g., cooktop 100. Hereinafter, method 200 will be described with specific reference to FIG. 6.

At step 202, method 200 may include receiving a remote signal from an activated cookware item. In detail, a cooktop appliance (e.g., incorporating one or more heating assemblies or burners as described above) may determine that a cookware item (e.g., a smart cookware item including remote connectivity) has been activated for use in a cooking operation. For instance, a user may perform a predetermined action to activate the cookware item, such as a button press, a movement of the cookware item, or the like. For instance, the controller of the appliance may determine that the cookware item has been moved into proximity with the cooktop appliance (e.g., via a proximity determination). For another example, the cookware item may include a motion sensor (such as a gyroscope) which may activate the cookware item upon retrieval. A controller (e.g., controller 50) within the cookware item may then receive one or more wireless (or remote) signals from the cookware item (e.g., from a wireless communication module).

The remote signal may include information relating to the cookware item. For instance, the remote signal may include an identification (e.g., a cookware identifier) which allows the controller of the cooktop appliance to determine a size of the cookware item. The cookware identifier may be a string or sequence of characters associated with the cookware item. Accordingly, unique cookware items may be identified by unique cookware identifiers. The controller may then ascertain a size (e.g., diameter) of the cookware item. According to some embodiments, the controller performs a look-up on a table (e.g., as shown in FIG. 5). The table may provide a base area, dimensions, or diameter of the activated cookware item.

At step 204, method 200 may include determining a recommended burner arrangement of the plurality of burners in response to receiving the remote signal from the activated cookware item. In detail, the controller may associate the activated cookware item with one or more burners of the plurality of burners on the cooktop appliance. As described above, the plurality of burners may include one or more burners having varying sizes (e.g., by activation of one or more concentric burner diameters). The controller may thus determine a recommended (suggested, most efficient) burner arrangement (e.g., of one or more burner diameters) according to the base diameter of the activated cookware item. For at least one example, a burner (e.g., first burner 108) on the cooktop appliance has three concentric burner diameters of 6 inches, 8 inches, and 10 inches. The controller may determine that the base diameter of the activated cookware item is 8.5 inches. Thus, the controller may determine that the appropriate burner diameter (or burner arrangement) is the 8 inch burner diameter. Additionally or alternatively, the burner arrangement may include one or more discrete burners activated together (e.g., two adjacent burners to form a griddle-type burner arrangement).

As described above, the cookware items (and associated cookware identifiers) may be stored within a look-up table. The look-up table may be stored on the controller of the appliance. Additionally or alternatively, the look-up table may be stored remotely from the appliance (e.g., within the cookware item, on an external server, etc.). The look-up table may include one or more burner diameters (or arrangements, combinations, etc.) associated with each respective cookware item. For instance, the base diameters of some cookware items may be suited to more than one burner arrangement on the cooktop appliance. Thus, the look-up table may include a plurality of recommended burner diameters.

Each burner arrangement may also have an identifier. For instance, burner diameter identifiers may be sequences of characters associated with each burner diameter. Referring to the example above (first burner 108), a first diameter may have a burner diameter identifier of "1A," a second diameter may have a burner diameter identifier of "1B," and a third diameter may have a burner diameter identifier of "1C." In detail, the first character of the identifier may indicate which particular burner is referenced (e.g., a 1 for first burner 108, a 2 for second burner 110, etc.). The second character of the identifier may indicate which diameter of a variable diameter burner is referenced (e.g., A for first diameter 1081, B for second diameter 1082, etc.). It should be noted that these burner diameter identifiers are given by way of example only, and that any suitable identification means may be incorporated.

At step 206, method 200 may include directing activation of one or more burners of the plurality of burners based on the recommended burner arrangement. In detail, the controller of the appliance may present the suggested or recommended burner arrangement to the user. According to some embodiments, the cooktop appliance includes a display (e.g., display 124) which includes a graphical representation of the burner diameters. The burner diameters may be represented as concentric rings. Thus, directing the activation of one or more burners may include accentuating the recommended burner diameters via the graphical representation thereof on the display. The accentuation may include illuminating the recommended burner diameter on the graphical representation. This may include displaying the recommended burner diameter in a color different from the colors of the other burner diameters, pulsating the recommended burner diameter, or another similar illumination manner. As mentioned above, more than one appropriate burner (or burner diameter) may be recommended by the controller. For instance, a plurality of burners having the same or similar diameters (e.g., within 1 inch of a cookware base diameter) may be included in the recommended burner arrangement. Accordingly, multiple burner diameters from multiple burners may be accentuated, illuminated, or the like.

According to another example, the cooktop appliance includes a user interface panel (e.g., user interface panel 120) including a plurality of controls (e.g., burner diameter selectors, burner power sliders, etc.). The burner diameters may be represented as a single, double, or triple concentric ring selection on the user interface panel. Thus, directing the activation of one or more burners may include accentuating the recommended burner diameters via the burner diameter selectors. The accentuation may include illuminating the recommended burner diameter on the burner diameter selectors. This may include displaying the recommended burner diameter in a color different from the colors of the other burner diameters, pulsating the recommended burner diameter, or another similar illumination manner. As mentioned above, more than one appropriate burner may contain the recommended burner diameter. Accordingly, multiple burner diameters from multiple burners may be accentuated, illuminated, or the like.

Subsequently, the controller of the cooktop appliance may wait for a user input to select a burner diameter. For instance, the controller may wait a predetermined amount of time while presenting the recommended burner diameter (e.g., via the display or user interface panel). The predetermined amount of time may be between about 5 seconds and about 30 seconds. It should be noted that the ranges given herein are by way of example only, and that the predetermined amount of time may be any suitable length of time. Referring briefly to FIG. 7, the controller may then determine whether the user has selected one of the recommended burner diameters and requested a cooking cycle. For instance, the controller may confirm that the user has selected a burner diameter that matches the recommended or suggested burner diameter. For instance, the controller may recommend or suggest an 8 inch burner diameter. Multiple burners on the cooktop appliance may be 8 inches. The controller may confirm that one of the 8 inch burners has been selected and activated for the cooking operation by the user.

The controller may perform a confirmation action in response to determining that one of the recommended burner diameters has been selected. For instance, the controller may emit a confirmation tone via a speaker (e.g., speaker 132). Additionally or alternatively, the controller may direct the display to display a confirmation message (e.g., "Recommended Burner Selected"). The confirmation action may be performed for a predetermined amount of time. For at least one example, the confirmation message may be displayed for between about 3 seconds and about 5 seconds. Additional or alternative confirmation actions may be performed by the cooktop appliance.

Conversely, the controller may determine that the user has selected a different burner diameter size from the recommended or suggested burner diameter or diameters. Thus, the controller may emit an error tone (e.g., via the speaker). Additionally or alternatively, the controller may display an error message via the display. The error message may include a prompt to accept a selection change request to the recommended burner arrangement and restart the selection process. Referring again to FIG. 7, the controller may then wait for a user input to accept the recommended selection change request. At this point, the controller may present the recommended burner diameters to the user again. The user may thus select another burner or burner diameter and initiate the cooking cycle. For instance, the controller may determine whether the user selects a different burner (e.g., the recommended or suggested burner). The controller may wait a predetermined amount of time to determine an alternate burner selection. For example, the predetermined amount of time is between about 3 seconds and about 5 seconds. From here, the controller may again determine whether one of the suggested burner diameters has been selected. According to another example, the controller receives an input from the user to dismiss the change request and use the user selected, non-recommended burner.

According to some embodiments, the controller can further disable any burner diameters (or burners) that are not recommended or suggested. For instance, if the controller determines a recommended burner size of 8 inches, the controller may disable a selection of any burner that is not 8 inches in diameter. This may include any burner diameters that are smaller than 8 inches and any burner diameters that are larger than 8 inches. In some embodiments, the controller disables burner diameters that are larger than 8 inches. Additionally or alternatively, the controller may prompt the user to select a different burner size (e.g., one that has not been disabled).

Upon determining that the user has made a final burner selection, the controller may allow an initiation of the cooking operation. In some instances, the controller allows the activation and subsequent heating of the selected burner.

According to the embodiments described herein, a controller of a cooking appliance may determine a recommended or suggested burner size according to a cookware item to be used in a cooking operation. A user may activate a cookware item having a remote connection ability. The cooking appliance may establish a wireless connection with the cookware item. The cooking appliance may then retrieve data about the activated cookware item from a look-up table. The data may include a base diameter of the cookware item as well as one or more predetermined recommended burner sizes. The cooking appliance may then present to the user the recommended burner size or sizes (recommended burner diameters) for use with the activated cookware item. The cooking appliance may then confirm that the correct burner has been selected before initiating the cooking operation. Advantageously, the efficient cooking operations are recommended to users to reduce cooking time and improve overall functionality of the cooking appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a cooktop appliance, the cooktop appliance comprising a cooktop surface comprising a plurality of burners and a display screen, each burner of the plurality of burners comprising one or more distinct concentric rings for providing heat production, each distinct concentric ring defining a burner diameter, the display screen displaying a plurality of burner sizes as a plurality of rings; the method comprising:

receiving a remote signal from an activated cookware item;

determining a recommended burner arrangement of the plurality of burners in response to receiving the remote signal from the activated cookware item, wherein determining the recommended burner arrangement of the plurality of burners comprises associating the activated cookware item with one or more distinct concentric rings based on the burner diameter of the one or more distinct concentric rings and a base diameter of the activated cookware item;

illuminating at least one recommended ring associated with the recommended burner arrangement at the display screen; and directing activation of one or more burners of the plurality of burners based on the recommended burner arrangement following illuminating at least one recommended ring associated with the recommended burner arrangement at the display screen.

2. The method of claim 1, further comprising:

receiving a burner selection via a user in response to directing the activation of the one or more burners;

determining that the burner selection matches the recommended burner arrangement; and outputting a confirmation signal via the cooktop surface in response to determining that the burner selection matches the recommended burner arrangement.

3. The method of claim 2, wherein the confirmation signal comprises at least one of an audible confirmation tone or a visual confirmation message, the visual confirmation message being displayed via one or more light sources.

4. The method of claim 1, further comprising:

receiving a burner selection via a user in response to directing the activation of the one or more burners;

determining that the burner selection is different from the recommended burner arrangement; and outputting an error signal via the cooktop surface in response to determining that the burner selection is different from the recommended burner arrangement.

5. The method of claim 4, wherein the error signal comprises at least one of an audible error tone or a prompt to select a different burner size.

6. The method of claim 1, wherein the cooktop appliance further comprises a touch panel, the touch panel comprising a plurality of control indicators and a plurality of selection indicators associated with a plurality of burner sizes, and wherein the directing the activation of the one or more burners comprises illuminating at least one of a control indicator and selection indicator associated with the recommended burner arrangement.

7. The method of claim 1, wherein the remote signal from the activated cookware item comprises a table of information, the table of information comprising at least one of:

a cookware item type;

the base diameter of the cookware item;

a cookware item identifier; or one or more pre-associated burner arrangements.

8. The method of claim 1, further comprising:

disabling burners from the plurality of burners that are not in the recommended burner arrangement in response to determining the recommended burner arrangement of the plurality of burners.

9. The method of claim 1, further comprising:

determining that the cookware item has been activated prior to receiving the remote signal from the activated cookware item, wherein determining that the cookware item has been activated comprises establishing a wireless connection with the cookware item.

10. A cooktop appliance, comprising:

a cooking surface, the cooking surface comprising a plurality of burners, each burner of the plurality of burners comprising one or more distinct concentric rings for providing heat production, each distinct concentric ring defining a burner diameter;

a control panel operably coupled to the cooking surface, the control panel comprising a plurality of controls for operating the plurality of burners a display screen provided on the control panel, the display screen displaying a plurality of burner sizes as a plurality of rings; and a controller operably coupled to the cooking surface and the control panel, the controller comprising a wireless connection module, wherein the controller is configured for:

determining that a cookware item has been activated;

receiving a remote signal from the activated cookware item in response to determining the cookware item has been activated;

determining a recommended burner arrangement of the plurality of burners in response to receiving the remote signal from the activated cookware item, wherein determining the recommended burner arrangement of the plurality of burners comprises associating the cookware item with one or more distinct concentric rings of one or more burners based on the burner diameter of the one or more distinct concentric rings and a base diameter of the cookware item;

illuminating at least one recommended ring associated with the recommended burner arrangement at the display screen; and directing activation of one or more burners of the plurality of burners based on the recommended burner arrangement following illuminating at least one recommended ring associated with the recommended burner arrangement.

11. The cooktop appliance of claim 10, wherein the controller is further configured for:

receiving a burner selection via the control panel in response to directing the activation of the one or more burners;

determining that the burner selection matches the recommended burner arrangement; and outputting a confirmation signal via the cooking surface in response to determining that the burner selection matches the recommended burner arrangement.

12. The cooktop appliance of claim 11, wherein the confirmation signal comprises at least one of an audible confirmation tone or a visual confirmation message, the visual confirmation message being displayed via one or more light sources.

13. The cooktop appliance of claim 10, wherein the controller is further configured for:

receiving a burner selection in response to directing the activation of the one or more burners;

determining that the burner selection is different from the recommended burner arrangement; and outputting an error signal via the cooking surface in response to determining that the burner selection is different from the recommended burner arrangement.

14. The cooktop appliance of claim 13, wherein the error signal comprises at least one of an audible error tone or a prompt to select a different burner size.

15. The cooktop appliance of claim 10, further comprising:

a touch panel provided on the control panel, the touch panel comprising a plurality of control indicators and a plurality of selection indicators associated with a plurality of burner sizes, and wherein the directing the activation of the one or more burners comprises illuminating at least one of a control indicator and selection indicator associated with the recommended burner arrangement.

16. The cooktop appliance of claim 10, wherein determining that the cookware item has been activated comprises establishing a wireless connection with the cookware item.

17. The cooktop appliance of claim 10, wherein the remote signal from the activated cookware item comprises a table of information, the table of information comprising at least one of:
   a cookware item type;
   a base diameter of the cookware item;
   a cookware item identifier; and
   one or more pre-associated burner arrangements.

18. The cooktop appliance of claim 10, wherein the controller is further configured for:
   disabling burners from the plurality of burners that are not in the recommended burner arrangement in response to determining the recommended burner arrangement of the plurality of burners.

\* \* \* \* \*